(12) United States Patent
Jefferson

(10) Patent No.: US 7,497,046 B1
(45) Date of Patent: Mar. 3, 2009

(54) SLOW SINK LURE

(76) Inventor: Hubert Shelly Jefferson, P.O. Box 20098, Sarasota, FL (US) 34276

( * ) Notice: Subject to any disclaimer, the term of this patent is extended or adjusted under 35 U.S.C. 154(b) by 0 days.

(21) Appl. No.: 11/640,031

(22) Filed: Dec. 15, 2006

(51) Int. Cl.
*A01K 85/00* (2006.01)

(52) U.S. Cl. .............. 43/42.24; 43/42.37; 43/42.38; 43/44.4; 43/44.8

(58) Field of Classification Search ........ 43/42.24, 43/42.28, 42.37, 42.38, 42.39, 42.36, 44.2, 43/44.4, 44.6, 44.8
See application file for complete search history.

(56) References Cited

U.S. PATENT DOCUMENTS

| | | | | | |
|---|---|---|---|---|---|
| 994,927 | A | * | 6/1911 | Jefferson | 43/42.37 |
| 1,257,008 | A | * | 2/1918 | McCarthy | 43/42.37 |
| 1,497,019 | A | * | 6/1924 | Hennings | 43/42.37 |
| 1,518,199 | A | * | 12/1924 | Hennings | 43/42.37 |
| 1,557,083 | A | * | 10/1925 | Peckinpaugh | 43/42.37 |
| 1,814,450 | A | * | 7/1931 | Nelson | 43/44.2 |
| 1,994,692 | A | * | 3/1935 | Davenport | 43/42.28 |
| 2,183,816 | A | * | 12/1939 | Lovelace | 43/42.39 |
| 2,216,929 | A | * | 10/1940 | Zander et al. | 43/42.24 |
| 2,316,048 | A | * | 4/1943 | Clarke | 43/44.2 |
| 2,461,755 | A | * | 2/1949 | Miller | 43/44.8 |
| 2,467,971 | A | * | 4/1949 | Frair | 43/44.2 |
| 2,473,142 | A | * | 6/1949 | Gilmore | 43/42.37 |
| 2,518,593 | A | * | 8/1950 | Bell | 43/44.2 |
| 2,540,716 | A | * | 2/1951 | Deimler | 43/42.37 |
| 2,661,564 | A | * | 12/1953 | Weigandt | 43/42.38 |
| 2,738,610 | A | * | 3/1956 | Rice | 43/42.37 |
| 2,750,702 | A | * | 6/1956 | Hartig | 43/42.28 |
| 2,763,086 | A | * | 9/1956 | Johnson et al. | 43/44.2 |
| 2,791,056 | A | * | 5/1957 | Davis | 43/42.36 |
| 2,847,791 | A | * | 8/1958 | Simmons | 43/42.36 |
| 2,848,836 | A | * | 8/1958 | Dodd | 43/44.6 |
| 2,931,123 | A | * | 4/1960 | Jensen, Jr. | 43/42.28 |
| 3,040,467 | A | * | 6/1962 | Norton | 43/44.6 |
| 3,426,467 | A | * | 2/1969 | Bryant | 43/42.28 |
| 3,724,116 | A | * | 4/1973 | Lindner et al. | 43/44.8 |
| 3,854,233 | A | * | 12/1974 | Browning, III | 43/42.29 |
| 3,914,895 | A | * | 10/1975 | Mize | 43/42.28 |
| 4,054,004 | A | * | 10/1977 | Schott | 43/42.39 |
| 4,067,135 | A | * | 1/1978 | Martin | 43/44.6 |
| 4,094,087 | A | * | 6/1978 | Carpenter | 43/42.24 |
| 4,163,337 | A | * | 8/1979 | Kress | 43/42.36 |
| 4,414,772 | A | * | 11/1983 | Duncan | 43/42.36 |
| 4,744,168 | A | * | 5/1988 | McClellan | 43/42.24 |
| 4,791,749 | A | * | 12/1988 | Stazo | 43/42.24 |
| 4,819,366 | A | * | 4/1989 | Manno | 43/42.39 |
| 4,848,023 | A | * | 7/1989 | Ryder et al. | 43/44.6 |

(Continued)

*Primary Examiner*—Darren W Ark
(74) *Attorney, Agent, or Firm*—Dorothy S. Morse

(57) ABSTRACT

A two-part semi-buoyant fishing lure that through select design and materials solves the problem of controlling and maintaining the placement of the lure without the usual complicated rig system accompaniment. The balance of weight that enables an angler to place and keep the lure in the top three feet of water, where it will be most attractive to top water fish, is derived from the combination of a buoyant head and a solid soft body. If pull is maintained, it will stay in the area three feet or less from the surface. The shape of the head allows for a true straight pull. It also looks like live bait and behaves in a manner attractive to top water fish, including popular sport fish. Further, a kink in the shank holds the head on and prevents its rotation relative to the body portion of the lure during use.

15 Claims, 2 Drawing Sheets

U.S. PATENT DOCUMENTS

| | | | | |
|---|---|---|---|---|
| 4,858,367 | A * | 8/1989 | Rabideau | 43/42.28 |
| 4,907,364 | A * | 3/1990 | Hedman | 43/44.8 |
| 4,914,851 | A * | 4/1990 | Acker | 43/42.41 |
| 4,918,854 | A * | 4/1990 | Webre, Jr. | 43/42.39 |
| 4,942,689 | A * | 7/1990 | Link et al. | 43/42.24 |
| 5,070,639 | A * | 12/1991 | Pippert | 43/42.24 |
| 5,105,575 | A * | 4/1992 | Robertaccio | 43/42.37 |
| 5,119,581 | A * | 6/1992 | Rudolph | 43/42.37 |
| 5,177,895 | A * | 1/1993 | Baron | 43/44.6 |
| 5,335,441 | A * | 8/1994 | Blackwell | 43/42.36 |
| 5,377,442 | A * | 1/1995 | Gariglio | 43/44.4 |
| 5,381,620 | A * | 1/1995 | Gibbs | 43/42.09 |
| 5,438,790 | A * | 8/1995 | Rigney | 43/42.24 |
| 5,564,220 | A * | 10/1996 | Blicha | 43/42.39 |
| 5,778,593 | A * | 7/1998 | Baron | 43/44.4 |
| 5,815,978 | A * | 10/1998 | Huddleston | 43/42.39 |
| 5,829,186 | A * | 11/1998 | Schultz et al. | 43/44.8 |
| 5,862,623 | A * | 1/1999 | MacPherson | 43/42.24 |
| 6,061,948 | A * | 5/2000 | Boucek | 43/42.39 |
| 6,141,900 | A * | 11/2000 | Rudolph | 43/42.24 |
| 6,154,999 | A * | 12/2000 | Woods | 43/42.28 |
| 6,226,918 | B1 * | 5/2001 | Rigney | 43/42.24 |
| 6,408,565 | B1 * | 6/2002 | Duncan | 43/42.06 |
| 6,598,336 | B2 * | 7/2003 | Link | 43/42.28 |
| 6,618,979 | B2 * | 9/2003 | Wacha | 43/42.36 |
| 6,675,526 | B1 * | 1/2004 | Baron | 43/42.36 |
| 6,708,442 | B2 * | 3/2004 | Kress et al. | 43/44.4 |
| 6,871,442 | B2 * | 3/2005 | Wyatt | 43/44.4 |
| 7,234,267 | B1 * | 6/2007 | Konstant | 43/42.24 |
| 7,263,798 | B2 * | 9/2007 | Nichols | 43/42.24 |
| 7,415,793 | B1 * | 8/2008 | Borchardt | 43/42.24 |
| 2003/0159328 | A1 * | 8/2003 | Acker | 43/42.37 |
| 2005/0268525 | A1 * | 12/2005 | Kalazich | 43/44.4 |
| 2008/0083154 | A1 * | 4/2008 | Gregory | 43/44.8 |
| 2008/0127542 | A1 * | 6/2008 | Young | 43/42.24 |
| 2008/0155883 | A1 * | 7/2008 | Corbitt | 43/42.24 |

* cited by examiner

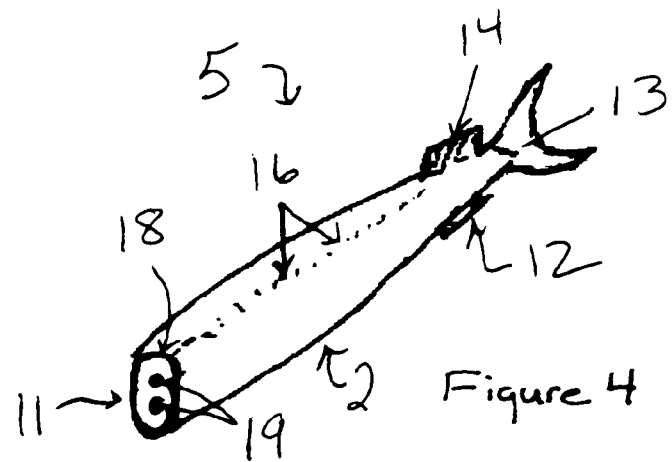
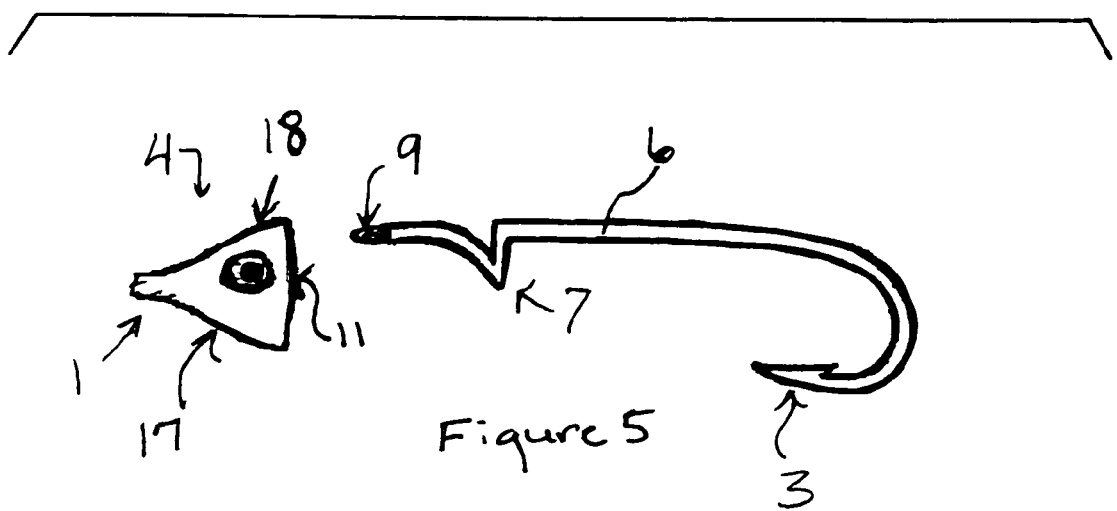

SLOW SINK LURE

CROSS-REFERENCES TO RELATED APPLICATIONS

None

BACKGROUND

1. Field of the Invention

This invention relates to the field of fishing lures, specifically to a two-part semi-buoyant fishing lure that through select design and material solves the problems of controlling and maintaining the placement of the lure without the usual complicated rig system accompaniment. The balance of weight that enables an angler to place and keep the present invention lure in the top three feet of water, where it will be most attractive to top water fish, is derived from the combination of a buoyant head and a solid soft body. If pull is maintained, the present invention fishing lure will stay in the area three feet or less from the surface. It also looks like live bait and behaves in a manner attractive to top water fish, including popular sport fish. Further, a kink in the present invention shank holds the head on and prevents its rotation relative to the body portion of the lure during use.

2. Description of the Related Art

There are many two-part lures available addressing many angles of fishing. No prior art lure is known that is able to pull depth of less than three feet, also looks like live bait, and behaves in a manner attractive to top water fish.

There are several lures similar in appearance to the present invention, such as U.S. Pat. No. 5,564,220 to Blicha (1996). However, the Blicha invention focuses on the make-up of the lead-head covering, which is made to sink rapidly and is therefore directly contrary to the targeted behavior of the present invention fishing lure, which won't sink if pull is maintained. Also, the invention disclosed in U.S. Pat. No. 6,408,565 to Duncan (2002) closely resembles the present invention fishing lure in appearance. However, the Duncam lure is designed to look and perform in a substantially different manner. It uses a duct in the head to force specific performance while it is being trolled. Further, the Duncan lure is distinctly different from the present invention in its pattern of movement, which is the result of the relationship between the head and the tail sections. In addition, the invention disclosed in U.S. Pat. No. 5,815,978 to Huddleston (1998) addresses bait movement with a complicated cut out system. The head of this bait is not buoyant, as is the present invention head, and the performance of the Huddleston bait is dictated by its cutouts. The placement and maintenance of placement relative to a water surface is entirely secondary to the shape and use of the Huddleston and Duncan lures. Further, while the present invention lure is a shallow fishing lure, it is not a top water lure. The invention disclosed in U.S. Pat. No. 4,414,772 to Duncan (1983) is a top water lure, which can be added to and decorated as the fisherman desires. In contrast, the present invention lure has two parts which are specific and necessary to the other, and it requires no appurtenances. Also, while the fishing lure in U.S. Pat. No. 5,438,790 to Rigney (1995) addresses the problem of slow sinking, it does so in a manner and with an appearance entirely difference from the present invention. The Rigney invention uses a sponge-like material for the body to compensate for the density of water. Further, its shape is that of a crawfish used in fresh water fishing. In contrast, the present invention can be used to attract both fresh water and salt water fish. Also in contrast to the present invention, the Rigney lure also has a common lead head jig head, which is made to sink.

BRIEF SUMMARY OF THE INVENTION

The primary object of this invention is to provide a two-part semi-buoyant fishing lure that through select design, material, and balance of weight solves the problem of controlling and maintaining the placement of the lure within the top three feet of water, where it will be most attractive to top water fish, without the usual complicated rig system accompaniment. Another object of this invention is to provide a fishing lure that can be maintained within the top three feet of water when pull is maintained. It is a further object of this invention to provide a fishing lure that looks like live bait and behaves in a manner attractive to top water fish. It is also an object of this invention to provide a fishing lure that has a buoyant head and a solid soft body. It is a further object of this invention to provide a fishing lure that can be used in both fresh water and salt water. Another object of this invention is to provide a fishing lure that can be used to attract popular sport fish. A further object of this invention is to provide a two-part fishing lure with means to prevent head rotation relative to the body portion of the lure during use.

The present invention combines buoyant and slow-sinking materials with the shape of a natural food source of top water fish. The buoyant head of the lure, combined with the weight of the body and hook, forms an optimal sink rate that when pulled along through the water will maintain a depth of three feet or less. Further, the head is shaped hydrodynamically, similar to the hull of a boat, so that is many travel in a straight line. The flexibility of the soft body of the present invention and the flowing water creates movement performing much the same as a Ballyhoo, one of the most desirable bait fish. The angular shape of the head forces the head into an advantageous horizontally-oriented path, instead of an angular one. The preferred present invention body is long and slender, and made of a flexible plastic. Further, the body has dorsal, bottom, and caudal fins. In addition, the definition of scales on the present invention body is inherent in the molding process, with scales adding to the realism of the lure's appearance. Coloring of the present invention lure head and body is also contemplated, and the angler can select present invention lures of differing color as needed to conform to the existing fishing conditions. When combined, the head and body of the present invention form a fishing lure which is semi-buoyant, easy to maintain in a shallow pull, and performs in much the same manner as live bait. The head is attached to the body via the shank of the hook by impaling the neck area of the body and sliding the body along the hook shank until it meets the head. The barb end of the hook then juts from the lower abdomen. The body is kept from displacement or rotation on the hook by the hook placement within the body, and further by a kink in the hook shank. The base of the head should meet the neck of the body symmetrically. Further, the kink in the hook shank is positioned within the head of the present invention and prevents head rotation relative to the body. The kink in the hook shank also provides appropriately placed weight in the buoyant head so that the triangular-shaped head acts like a keel. Further, the weight balance provided by the kink in the hook shank pulls down the present invention head down, which in combination with the triangular head shape allows it to run straight. The present invention lure can be effectively used in both fresh and salt water, and a hook eye projects from the mouth area of the present invention head for fishing line attachment.

The description herein provides preferred embodiments of the present invention but should not be construed as limiting its scope. For example, variations in the length and diameter dimensions of the body and head used, length and diameter dimensions of the hook eye attached to the hook shank, the coloring and markings on the body, and the dimension of the barb on the end of the hook, other than those shown and described herein, may be incorporated into the present invention. Thus the shape of the present invention should be determined by the appended claims and their legal equivalents, rather than being limited to the examples given.

BRIEF DESCRIPTION OF THE DRAWINGS

FIG. 4 is a perspective view of the body of the most preferred embodiment of the present invention having two vertically stacked dimples, the upper one of which is used for hook shank insertion.

FIG. 5 is a side view of head and hook shank in the most preferred embodiment of the present invention separated from one another for a more detailed view of the kink in the hook shank.

DETAILED DESCRIPTION OF PREFERRED EMBODIMENTS

Figure 3:
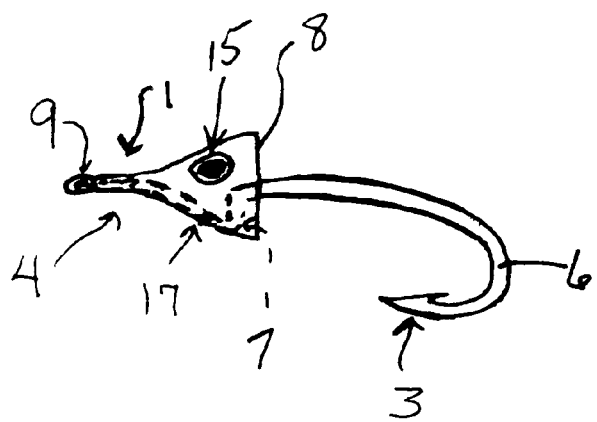
FIG. 3 is a side view of the head and hook assembly of the most preferred embodiment of the present invention, with the hook shank having a kink within the head and a barb on its distal end.

The present invention provides a two-part semi-buoyant fishing lure 10 that through select design and material solve the problem of controlling and maintaining the placement of lure 10 within the usual complicated rig system accompaniment (not shown) required in the prior art. The balance of weight that enables an angler to place and keep lure 10 in the top three feet of water, where it will be most attractive to top water fish, is derived from the combination of a buoyant head 4 and a solid soft body 5. If pull is maintained, lure 10 will stay in the area three feet or less from the surface. Lure 10 also looks like live bait and behaves in a manner attractive to top water fish, including popular sport fish. Further, a kink 7 in the hook shank 6 used to join head 4 and body 5 holds the head 4 on and prevents its rotation relative to body 5 during use. As can be seen in FIGS. 3 and 5, hook shank 6 has two opposed ends, a hook eye 9 on one of said opposed ends and the other of said opposed ends having a barb 3. FIGS. 3 and 5 also show a first kinked portion in hook shank 6 that depends rearwardly from hook eye 9 with downward curvature that ends in an abruptly upturned and substantially straight and vertically extending piece that has a length dimension substantially similar to the vertical height dimension through which the downward curvature extends. Hereinafter that abrupt upturn of the vertically extending piece will be referred to generally as kink 7. A second portion of hook shank 6 is further shown in FIGS. 3 and 5 to extend between its first kinked portion and barb 3, with the second portion having downward and forward curvature that reverses the orientation of barb 3 so that it extends in the the same direction as hook eye 9 instead of the opposite direction from it. The shape of head 4 is generally triangular, similar to that of the bow of a boat, and the placement of kink 7 within the approximately bottom one-third of head 4 approximately positions most of the weight of head 4 so that the bottom portion of head 4 acts as a keel so that lure 10 runs straight and pulls true without rolling and spinning. Lure 10 can be made in different sizes, and functions well in both fresh and salt water.

Figure 1:
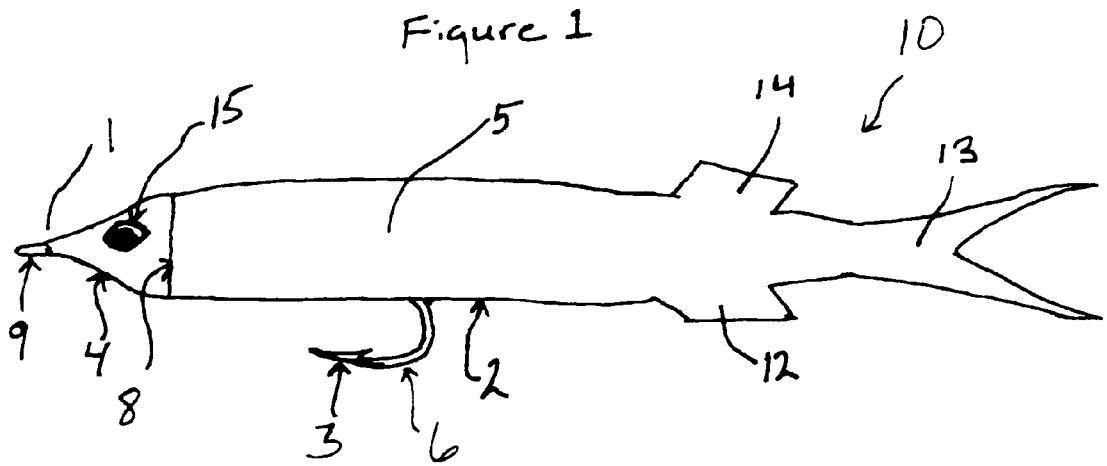
FIG. 1 is a side view of the most preferred embodiment of the present invention having a head connected to a body, and the barb of a hook projecting from the body.
Figure 2:
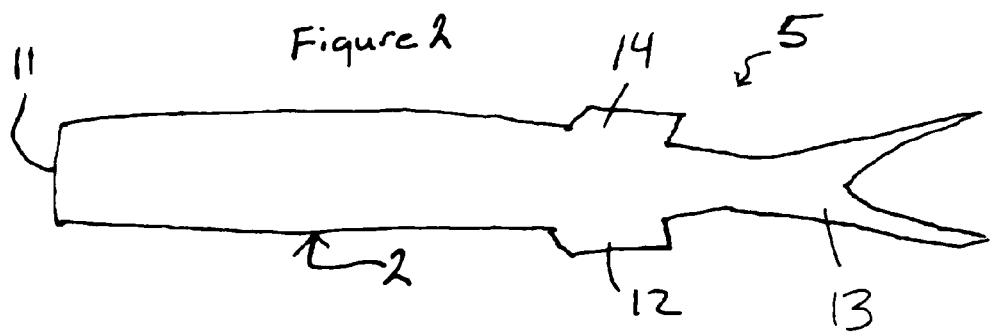
FIG. 2 is a side view of the body of the most preferred embodiment of the present invention.

FIGS. 1-5 show the most preferred embodiment of the present invention slow sink fishing lure 10, which is easy to maintain in a shallow pull and performs in much the same way as live bait. FIG. 1 shows the assembled lure 10 with head 4 and body 5 connected to one another. FIGS. 2 and 4 show body 5 in more detail, while FIGS. 3 and 5 show head 4 and a hook shank 6 that has a hook eye 9 at its proximal/nose end 1, a barb 3 at its opposed distal end, and a kink 7 between hook eye 9 and barb 3. FIG. 1 shows the head 4 of present invention lure 10 having an eye 15, a hook eye 9 at its proximal/nose end 1, and a base perimeter 8 that must match closely in configuration to the neck area 11 of body 5 when head 4 and body 5 are joined together. It is contemplated for head 4 to be buoyant, have a V-shaped bottom surface 17, and have a base perimeter configuration 8 with a rounded top surface 18 shaped to align with the rounded top surface 18 of the neck area 11 of body 5, so that the base perimeter configuration 8 of head 4 meets the neck area 11 of body 5 symmetrically. Head 4 is hydrodynamically shaped to travel in a straight line, with the attached flexible body 5 and flowing water creating movement so that lure 10 performs much the same as a Ballyhoo, one of the most desirable bait fish. The angular shape of head 4 also forces head 4 into a horizontal path, instead of an angular one. FIG. 1 also shows body 5 having a belly area 2, a dorsal fin 14, a bottom fin 12, and a tail fin configuration 13. Although only one dorsal fin 14 and one bottom fin 12 are shown, multiple dorsal fins 14 and bottom fins 12 are also contemplated as a part of the present invention. Other sizes and configurations of dorsal fin 14, bottom fin 12, and tail fin 13 are further contemplated, even though not shown, with those shown in FIGS. 1, 2, and 4 being provided only by way of example. It is contemplated for body 5 to be solid and sufficiently flexible for insertion of hook shank 6 there through. In addition, FIG. 1 shows the barb 3 on the distal end of a hook shank 6 downwardly extending below belly area 2. Barb 3 may have a different configuration and dimension from that shown in FIGS. 1, 3, and 5, and multiple barbs 3 can be used according to need and angler preference. Although the general appearance of lure 10 shown in FIG. 1 is not critical, its body 5 should be long and slender to closely resemble a natural food source of the top water fish targeted by the angler (not shown) using lure 10, and its weight and balance in combination with head 4 should allow a sink rate that when lure 10 is pulled along through the water by an angler (not shown), it maintains a vertical depth of less than three feet. FIG. 2 shows the neck area 11 of body 5, as well as its belly area 2, dorsal fin 14, caudal fin 12, and tail fin configuration 13. It is preferred that body 5 be long, slender, and soft, and made from a semi-buoyant flexible plastic. The definition of scales (not shown) on body 5 enhances the realism of the appearance of lure 10. Further, different dyes can be used for body 5 to conform to fishing conditions. Although not shown, glitter and/or sparkly tape can also be added to body 5. FIG. 3 shows that to provide optimal floatability for present invention lure 10, head 4 is designed so that approximately two-thirds of head 4 is above the part of hook shank 6 that is embedded within it. The purpose of such placement is to keep barb 3 from sinking beyond a certain speed when lure 10 is pulled by an angler (not shown). The generally triangular shape of head 4 with its V-shaped bottom 17 and rounded top 18 configuration, along with the downward and forward curvature of the barb 3 end of hook shank 6, keeps body 5 from rolling from side-to-side, and also keeps the pull line true. FIG. 3 shows the kink 7 of hook shank 6 embedded within the approximate lower one-third of head 4 between its nose end 1 and perimeter base 8. Kink 7 is configured to prevent head 4 from turning on hook shank 6. FIG. 1 also shows a hook eye 9 secured to or formed in the proximal end of hook shank 6. Head 4 is preferably painted with epoxy, using one or more colorants complementary to the color of body 5. Eyes 15 of appropriate size may be attached to or painted on head 4. FIG. 4 is a perspective view of body 5 showing two vertically stacked dimples 19, the upper one of which is used for hook shank 6 insertion. FIG. 4 also shows decorative markings/texture/adornment 16 on body 5 configured and positioned to add realism to body 5. Adornment may include but is not limited to dye, glitter, and sparkly tape. FIG. 4 further shows the neck area 11 of body 5, its belly area 2, dorsal fin 14, bottom fin 12, and tail fin configuration 13. FIG. 5 is a side view of head 4 and hook shank 6 separated from one another in the most preferred embodiment of the present invention lure 10. The proximal end of hook shank 6 with its hook eye 9 is inserted through head 4 until hook eye 9 extends beyond the nose end 1 of head 4 and kink 7 is fully positioned within head 4. It is contemplated for hook shank 6 and kink 7 to be positioned substantially within the bottom one-third of the triangular-shaped head 4 and provide proper weight balance for head 4 so that its V-shaped bottom 17 acts like the keel of a boat and so that head 4 is pulled down and runs straight. It is the combination of weight placement in combination with the generally triangular shape of head 4 that allows lure 10 to run straight.

To make scales on body 5 to increase realism in the appearance of lure 10, real bait (not shown) can be used in the molding process. One would first select the size of bait fish needed by the angler (not shown), and then the head of the bait fish would be removed just behind the gills. The remaining bait fish body would then be suspended within a wire cradle in a box larger than the length and width dimensions of the beheaded bait fish body. After marking the end of the box closed to the neck area of the bait fish body, mold mixture would then be introduced into the box so as to cover the bottom half of the fish body therein. When the mold mixture is set, release agent is sprayed into the box. Thereafter, more mold mixture is introduced into the box, filling it. After the mold mixture is set, the mold is peeled apart so that the bait fish body can be removed therefrom and discarded. A hole is then cut through the marked end of the box, and also through the portion of the mold material between the box and the cavity made by the bait fish body. Bodies 5 can then be made by using the cavity in the box, as follows. One would first reassemble the mold in the box and spray mold release into the mold cavity. Then, with a piece of wood taped over the open long side of the box, the box is upended so that the marked end with its hole is on top. Pliable soft plastic that has been heated to liquid form, with added color of choice, is then poured downward through the hole in the box. After the liquid plastic is fully set, the tape is removed and the mold pulled apart to release a body 5 of lure 10. The edge of the neck area 11 of body 5 is then cut even for proper alignment with the base perimeter configuration 8 of head 4, which can be made from various materials, including but not limited to wood. If made from wood, two pieces forming head 4 are secured together around the hook shank 6 via epoxy or other strongly bonding substance. Hook eye 9 should protrude from the nose area 1 of head 4. The barb 3 end of hook shank 6 should also be aligned for placement through the belly area 2 of body 5. Before painting with epoxy or other colorant, head 4 may be carved, molded, and/or sanded to achieve the needed balance of weight that enables an angler to place and keep lure 10 in the top three feet of water, where it will be most attractive to top water fish, and to form the shape of head 4 that allows for a true straight pull. When eyes 15 are painted on or applied by other means, lure 10 looks like live bait and behaves in a manner attractive to top water fish, including popular sport fish. The kink 7 in hook shank 6 holds the base perimeter configuration of head 4 against the neck area 11 of body 5 on and prevents the rotation of head 4 relative to body 5 during use of lure 10. Different dyes and dye combinations can be used to produce a variety of bodies 5 that conform to differing fishing conditions. The colorant for head 4 should be complementary to that used for body 5. Also, glitter and/or sparkly tape can also be added to body 5 for further enhancement. In addition to head 4, hook shank 6 must also be of proportionate size to body 5 for successful fishing with lure 10. By way of example only, and not limited thereto, a size 2-O hook shank is appropriate for a body 5 that is approximately five-and-one-fourth inches in length. To insert hook shake 6 into body 5, one would preferably clean hook shank 6 with acetone. Then, body 5 is impaled on the barb 3 end of hook shank 6 so that barb 3 moves through the uppermost dimple 19 that is substantially centered within body 5. Body 5 is then slid along hook shank 6 until the neck area 11 of body 5 is flush against the base perimeter configuration 8 of the head 4. When body 5 and head 4 are flush against one another, the barb 3 of hook shank 6 should be in a downwardly pointed orientation and extending through the belly area 2 of body 5. To fish with lure 10, one would use it in the same was one would use lived bait (not shown). Slow, methodical, sweeping movements of the forearm toward one's chest keeps lure 10 moving on a straight horizontal path within a three foot depth of the water's surface.

The preferred embodiment shown herein in FIGS. 1-5 is provided as one example of a preferred embodiment of the present invention. However, other embodiments are also contemplated to be a part of the present invention. Therefore, for a determination of the legal definition of the present invention, one must consult the appended claims.

What is claimed is:

1. A semi-buoyant fishing lure that can be easily maintained by an anger within three feet of the surface of water when given a steady pull, will slow sink, pull true at a slow retrieve, and run straight and horizontal to imitate movements of live bait fish in a manner attractive to top water fish, said fishing lure comprising:

a hook shank having two opposed ends, a hook eye on one of said opposed ends and a barb on the other of said opposed ends, said hook shank also having a first kinked portion depending rearwardly from said hook eye with a downward curvature that ends at a bottom end of an abruptly upturned and substantially straight and vertically extending piece that has a length dimension substantially similar to a vertical height dimension through which said downward curvature extends, said substantially straight and vertically extending piece having a top end opposite said bottom end, and said hook shank further having a second portion extending from said top end of said substantially straight and vertically extending piece to said barb end, with said second portion of said hook shank having a downward and forward curvature that orients said barb end so that it extends in a same direction as said hook eye;

a generally triangular-shaped buoyant head having a V-shaped bottom configuration, a nose area, and a base perimeter configuration; and an elongated flexible body having a neck area, at least one dimple in said neck area for use in inserting said barb end of said hook shank through said body, and a belly area, whereby when said first kinked portion of said hook shank is inserted into said head so that said hook eye extends through said nose area of said head and forwardly beyond it, said downward curvature of said first kinked portion becomes positioned adjacent to said V-shaped bottom configuration of said head and said abruptly upturned and substantially straight and vertically extending piece becomes positioned near said base perimeter configuration of said head, and further when said second portion of said hook shank is inserted into said neck end of said body and said neck end is moved toward said base perimeter configuration of said head until it is adjacent to it, said barb end of said second portion will extend through said belly area of said body and become positioned below said belly area with said barb end extending in the same direction as said hook eye, and a resulting weight balance of said first kinked portion within said head will allow said head to act as a keel, that in combination with the generally triangular shape of said head, and V-shaped bottom configuration, and said downward and forward curvature of said second portion of said hook shank, will all function in concert to keep said body from rolling from side to side and also keep the pull line true.

2. The lure of claim 1 wherein said head has a rounded top configuration.

3. The lure of claim 1 wherein said body further has a slender configuration.

4. The lure of claim 1 wherein said body has at least one dorsal fin, at least one bottom fin, and at least one tail fin.

5. The lure of claim 1 wherein said body has realism enhancing surface markings.

6. The lure of claim 1 wherein said body has realism enhancing surface texture.

7. The lure of claim 1 wherein said body is made from semi-buoyant material.

8. The lure of claim 1 wherein said body is made from molded plastic.

9. The lure of claim 1 wherein said head has at least one eye.

10. The lure of claim 1 wherein said base perimeter configuration of said head is flush against said neck area of said body.

11. The lure of claim 1 wherein said base perimeter configuration of said head is flush against said neck area of said body and said head and body meet symmetrically.

12. The lure of claim 1 wherein said body has adornment.

13. The lure of claim 12 wherein said adornment is selected from a group consisting of color, dye, glitter, and sparkly tape.

14. The lure of claim 1 wherein said body has a slender configuration, at least one dorsal fin, at least one bottom fin, and at least one tail fin.

15. The lure of claim 1 wherein said body has a slender configuration, at least one dorsal fin, at least one bottom fin, and at least on tail fin, and is also made from semi-buoyant material.

* * * * *